Nov. 24, 1942.    J. WENZL, JR    2,303,013
DEVICE FOR STRIPPING FROZEN CONFECTIONS FROM SPUR PLATES
Filed Dec. 9, 1941
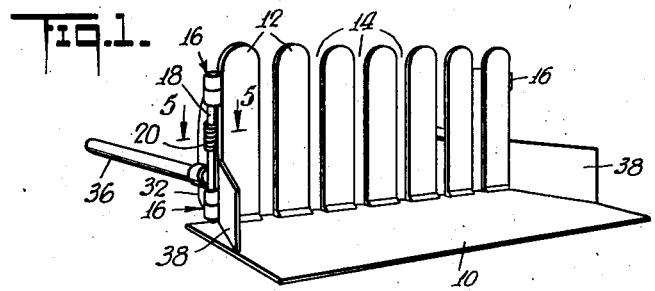
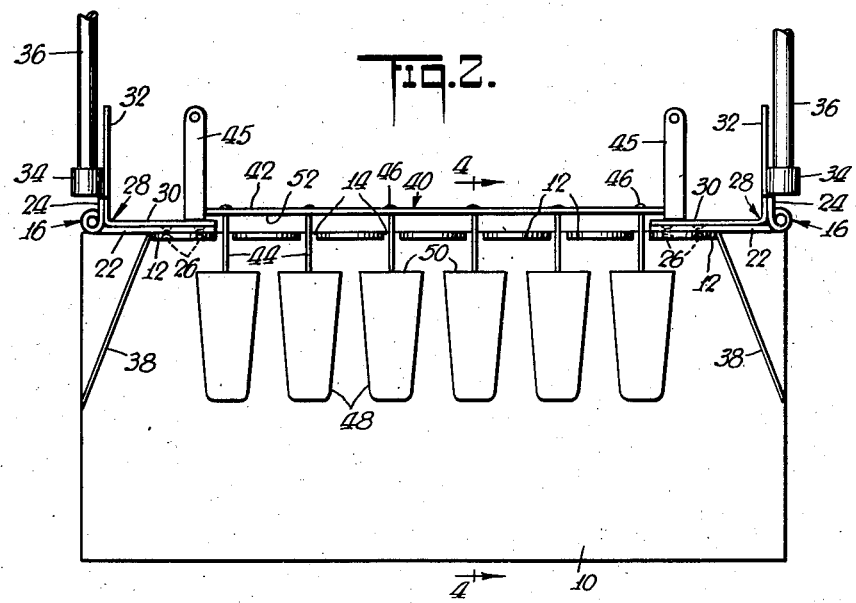
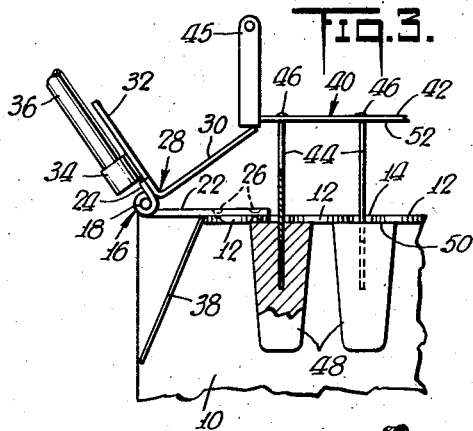
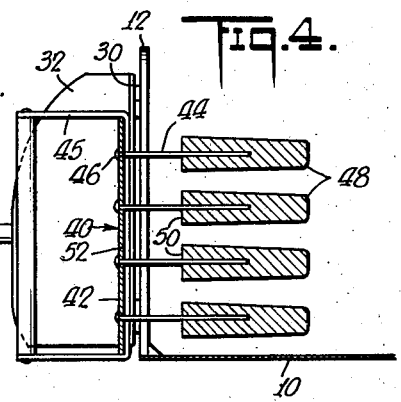
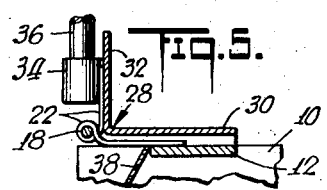
INVENTOR
John Wenzl, Jr.
BY Richard J. Cowling
ATTORNEY Patented Nov. 24, 1942

2,303,013

UNITED STATES PATENT OFFICE 2,303,013

DEVICE FOR STRIPPING FROZEN CONFECTIONS FROM SPUR PLATES

John Wenzl, Jr., Alhambra, Calif., assignor to Joe Lowe Corporation, New York, N. Y., a corporation of Delaware Application December 9, 1941, Serial No. 422,266

1 Claim. (Cl. 107—8)

The present invention relates to apparatus for simultaneously removing or harvesting a plurality of frozen confections or novelties, such as ice cream bars, sherbet and ice milk bars, individual servings and the like, made by a molding process with the use of conventional portable carriers or spur plates, which carriers or spur plates have a plurality of depending spurs or prongs onto which the confections have been bonded while being frozen in molds and by which they may be removed from such molds and manipulated during the coating, bagging and/or packaging operations. The invention has particular relation to apparatus for simultaneously removing a plurality of such confections from their respective spurs or prongs in a single operation in a most efficient, economical and sanitary manner.

An object of the present invention is to provide a simple, efficient and inexpensive stripping device, which is of a durable construction, having no complicated mechanism to get out of order, and very easy to manipulate.

Another object of the invention is the provision of portable apparatus of simple, inexpensive and sanitary construction for simultaneously removing a plurality of confections from a plurality of spaced spurs or prongs of a portable carrier in a single operation in a most efficient, economical and sanitary manner.

A further object of the invention is to provide a suitable manually operable stripping apparatus, which is capable of quickly and efficiently removing a plurality of confections from the respective spurs or prongs onto which they have been bonded or frozen by means of a pair of conveniently positioned hand operating levers, thereby assuring a steady, even pull longitudinally of the spur or prong, thus reducing the possibility of breaking or otherwise damaging the confections or their respective coatings.

Various other and further objects and advantages of the invention reside in the detailed construction of the apparatus, which result in simplicity, economy and efficiency, and will be apparent from the following detailed description, wherein a preferred form of embodiment of the invention is shown, reference being had for illustrative purposes to the accompanying drawing, forming a part hereof, in which:

Fig. 1 is a front perspective view of a stripping device made in accordance with the invention;

Fig. 2 is a top plan view of the device shown in Fig. 1, showing a conventional spur plate and its appended confections positioned therein preparatory to stripping;

Fig. 3 is a fragmentary top plan view, partly in section, of the device shown in Fig. 2, and illustrating the manner in which the device is operated for removing the confectionery products from their respective spurs of the spur plate;

Fig. 4 is a cross-sectional view of the apparatus shown in Fig. 2, the same being taken substantially along the line 4—4 thereof, looking in the direction of the arrows; and Fig. 5 is an enlarged fragmentary sectional view of the apparatus shown in Fig. 1, the same being taken substantially along the line 5—5 thereof, looking in the direction of the arrows.

Referring now to the drawing, there is shown in Fig. 1 a stripping device constructed in accordance with the invention. This device consists of a rectangularly shaped sheet-metal base plate 10, having a series of longitudinally spaced upstanding fingers 12 welded or otherwise fixedly secured thereto along its rear edge, providing a series of spaced open-ended slots 14 adapted to receive a series of correspondingly spaced rows of spurs or prongs of a spur plate hereinafter to be described. A conventional spring type hinge 16, having a vertically extending pintle 18, spring urging means 20 and a pair of hinge plates 22 and 24, is mounted outwardly from the back of each of the end fingers 12. The hinge plate 22 is spot welded or otherwise fixedly secured, as indicated at 26, to the back face of each of the end fingers 12, and the opposite hinge plate 24 has an angle clip 28 fixedly secured thereto by spot welding or other suitable means. The angle clip 28 is so mounted on the hinge plate 24 that one arm 30 is normally held tightly against the hinge plate 22 by the spring 20 while its opposite arm 32 extends rearwardly at right angles thereto. A cylindrical sleeve member 34 is suitably mounted outwardly of the arm 32 of the angle clip 28, and is adapted to receive axially thereof a handle member 36, which extends rearwardly therefrom. A pair of forwardly extending guide plates 38 are mounted obliquely of the base plate 10 adjacent the sides thereof for preventing the confections during the stripping operation from spreading laterally of the apparatus.

A conventional portable carrier or spur plate 40 consists of a main frame member or plate 42 of rectangular shape and of a size adapted to fit within the pan of a conventional open top mold (not shown), and a plurality of spaced depending spurs or prongs 44 suitably secured thereto, as by riveting, welding, etc., as indicated at 46.

The spacing arrangement of the spurs or prongs 44 corresponds to the spacing arrangement of the individual cavities of the mold with which the carrier 40 is adapted to be used. In the present embodiment the twenty-four spurs 44 are shown arranged in four transverse rows of six spurs each, but it is to be understood that this arrangement is entirely dependent upon the construction of the mold. Each spur 44 of the portable carrier 40 is intended to extend centrally of a correspondingly spaced mold cavity when the same is positioned in superimposed relationship on the open-top pan of the mold (not shown). For convenience in manipulating the carrier 40, upstanding handle members 45 are attached adjacent each end thereof.

When the confections 48 are frozen, they are securely bonded to the lower ends of the spurs or prongs 44 of the carrier 40, and by such means may be dipped into a coating material (not shown) and transported from place to place in the plant. They may be covered with glassine bags or the like (not shown) while still fastened to said spurs or prongs 44. When it is desired to remove the confections 48 from their respective spurs or prongs 44, the carrier 40 is manually positioned over the stripping device with the fingers 12 being moved into position between the tops 50 of the confections 48 and the underside 52 of the carrier 40. This may be accomplished by inserting each transverse row of spurs or prongs 44 within the open-ended slots 14 of the stripping device. The confections 48 are now ready to be stripped from their respective spurs or prongs 44, and this may be readily and easily accomplished by the operator by grasping the backwardly projecting handles 36 and manually moving them outwardly and away from each other. As the handles 36 are moved outwardly, the arms 30 of the angle clips 28 engage the underside of the plate 42 of the carrier 40 adjacent opposite ends forcing it rearwardly away from the fingers 12, withdrawing the spurs or prongs 44 therebetween. The confections 48, being wider than the slots 14 between adjacent fingers 12, abut against the front faces of said fingers 12, causing pressure to be exerted on the tops thereof, forcing them from said spurs 44. In this manner all of the confections 48 are removed from their respective spurs or prongs 44 simultaneously with a steady even force that will not tend to crack the confections, or their coatings if they are of the coated type, in a most efficient, economical and sanitary manner. The obliquely extending guide plates 38 prevent the confections 48 from scattering as they are released and drop from their respective spurs or prongs 44 onto the face plate 10.

Although I have only described in detail one form which the invention may assume, it will be apparent to those skilled in the art that the invention is not to be so limited, but that various modifications may be made therein without departing from the spirit thereof or from the scope of the appended claim.

What I claim is:

A stripping device of the character described comprising a horizontal base member having a plurality of upwardly extending spaced fingers forming a series of open-ended vertical slots adapted to receive a plurality of correspondingly spaced rows of spaced spurs of a portable carrier having confections bonded to the lower ends of said spurs, spaced lever-operable pivotal means mounted adjacent said fingers for engaging said carrier when said levers are separated to move said carrier away from said fingers whereby the tops of said confections are caused to engage said fingers and to be stripped from their respective spurs when the latter are drawn completely from said slots, said pivotal means including a spring for returning said levers to their normal position after the completion of said stripping operation.

JOHN WENZL, Jr.